June 27, 1939.     E. S. SMITH, JR     2,164,300
BRAKE
Filed Aug. 21, 1937
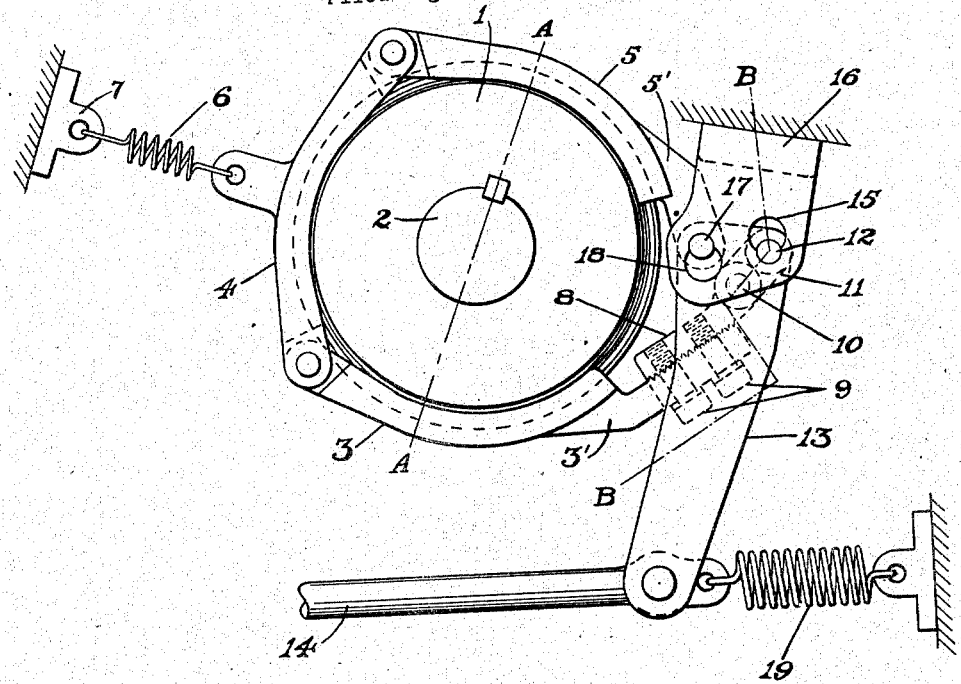
Fig. 1
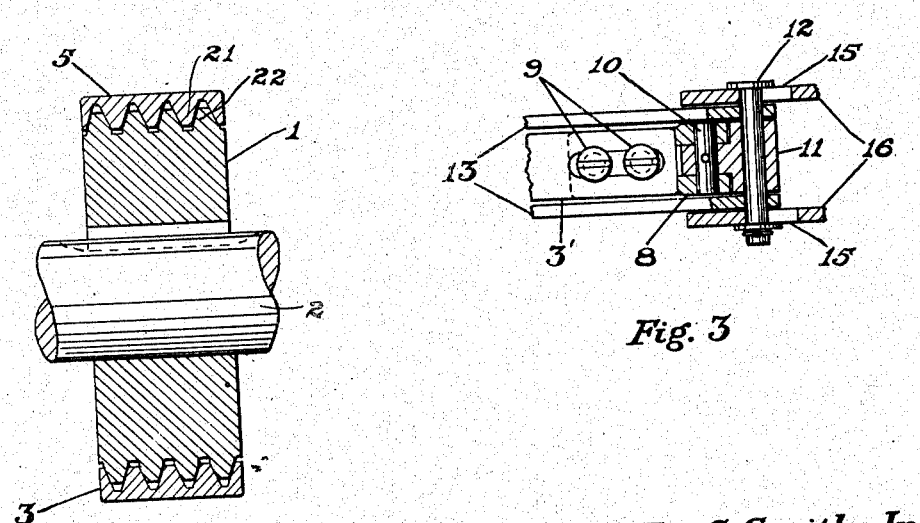
Fig. 2
Fig. 3
Ed S. Smith, Jr.
INVENTOR
BY Maxwell Barus
ATTORNEY Patented June 27, 1939

2,164,300

UNITED STATES PATENT OFFICE 2,164,300

BRAKE

Ed S. Smith, Jr., St. Albans, N. Y., assignor, by mesne assignments, to Reconstruction Finance Corporation, Minneapolis, Minn., a corporation of the United States Application August 21, 1937, Serial No. 160,233

19 Claims. (Cl. 188—77)

This invention relates to brakes and has for an object the provision of a novel braking means capable of providing a smooth acting and powerful braking force in either of two directions. A further object is to provide a braking means capable of being put into action instantly and with a minimum of work. The brake of my invention is particularly adapted to be placed in action by a light force acting thru a small distance and is also capable of prompt release. My novel braking means is moreover self-actuating in either of opposite directions of movement of the member to be braked, and is simple in construction, as well as highly reliable and efficient in operation, even where only a limited distance is available for movement of the brake-applying means. Other objects and advantages of the invention will be hereinafter described and claimed.

In the accompanying drawing:

Fig. 1 is a view in side elevation illustrating an embodiment of my invention.

Fig. 2 is a sectional view on line A—A of Fig. 1.

Fig. 3 is a view taken on line B—B of Fig. 1.

Referring to the drawing, my invention is illustrated in conjunction with a brake drum 1 splined to a shaft 2 for rotation therewith. The brake is shown as comprising three shoes 3, 4, and 5, the shoes 3 and 5 being pivotally connected to the intermediate shoe 4. Said shoe 4 may, as shown, be connected by a spring 6 with a stationary bracket 7.

An extension 3' of the shoe 3 is shown provided with an adjustable projection 8, secured thereto by screws 9, and connected by pin 10 to a link 11. The latter in turn has a pin 12 which passes therethru and also passes thru one end of a brake controlling member comprising a pair of parallel arms 13 pinned at their opposite ends to an operating rod 14. The pin 12 also passes thru slots 15 in a stationary bracket member comprising a pair of arms 16 on opposite sides of the controlling member arms 13.

The brake shoe 5 is also connected to the controlling member arms 13. For this purpose a pin 17 passes thru an extension 5' of shoe 5 and also thru the same end of said arms 13 that receives the pin 12. Pin 17 further extends thru slots 18 in the bracket arms 16.

The brake operating rod 14 is shown constantly urged to the right in Fig. 1 by a spring 19. Said rod may be drawn to the left by any suitable means such as a solenoid, or by hydraulic or manual means. The rod 14 might, for example, be secured to or integral with the plunger of a solenoid, or a hydraulic piston, or might be operated by a hand lever. Each of the brake shoes 3, 4, and 5 is preferably provided with inclined projections 21 adapted to engage in similarly inclined grooves 22 in the brake drum 1, thereby providing increased frictional engagement with said drum.

Let it now be assumed that the brake is to be applied while the drum 1 is rotating clockwise in Fig. 1. Upon release of the rod 14 to the action of spring 19 said rod is pulled to the right by said spring, shifting the attached end of controlling member 13 to the right and drawing the shoes 3 and 5 toward each other and into engagement with the drum. Only a slight movement of member 13 is required for this purpose. The clockwise rotation of the drum 1, in conjunction with the engagement of the latter with shoe 3, not only opposes movement of pin 12 upwardly in slot 15, but also draws said pin into engagement with the lower end of the said slot. Said pin 12 now serves as a stationary fulcrum or anchor, about which member 13 turns, bringing the shoes 3, 4, and 5 into tighter engagement with the drum 1. The turning of member 13 about said pin 12 is caused not only by the force applied thereto by the spring 19 but also by the engagement of the rotating drum 1 with shoe 5, the clockwise rotation of said drum tending to drag said shoe 5 with it and thereby effect increased application of all of the shoes to said drum.

If, on the other hand, the drum 1 is rotating counter-clockwise, when member 13 is operated to apply the brake shoes, the engagement of said drum with shoe 5 draws the pin 17 to the upper end of slot 18 where said pin becomes the anchor or fulcrum about which the member 13 turns further to apply the shoes more tightly. The counter-clockwise rotation of drum 1 and its engagement with shoe 3 assist in this action.

To release the brake, the rod 14 is drawn to the left, against the action of the spring 19. Assuming the drum 1 to be rotating clockwise, the pull on the shoe 5 is now released and said shoe becomes disengaged from the drum. The end of the intermediate shoe 4 which is connected to shoe 5 now is released and shoe 4 becomes disengaged (its disengagement being hastened by the spring 6) after which shoe 3 becomes disengaged. These actions, while being in sequence, occur almost instantaneously. If the drum 1 is rotating counter-clockwise when the rod 14 is drawn to the left to release the brake, the releasing action occurs first at shoe 3 and then at shoes 4 and 5 in rapid succession.

The speed and promptness of the disengagement of the brake shoes on release is effected by the angles of the wedging contact surfaces 21 and 22 on said shoes and the brake drum. If the angle included between the sides of the wedging projections and grooves is too small the shoes may tend to stick to the drum, and if said angle is too large the braking effect is less. In the embodiment here illustrated the included angle aforesaid is about 45°, which is found to present no sticking tendency and also provides the desired braking effect. It is of course to be understood that the wedge angle referred to may be varied as desired.

It will be seen that the brake of my invention enables a smooth, prompt, and powerful braking force to be applied in either direction of operation of the drum 1, that the brake application is assisted by the motion of the drum itself in either direction, and that it is set into action and released by a light force acting thru a small distance, or in other words with a minimum of work. It at the same time is of simple and inexpensive construction, and may be used where only a very limited space is available for operation of the brake controlling member.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A brake for a movable element, said brake comprising a plurality of interconnected shoes, a brake controling member, a stationary member having a pair of slots therein at one side of said element and spaced different distances from said element, means extending into one of said slots and connecting one of said shoes with said brake controlling member, and means extending into the other of said slots and connecting another of said shoes with said brake controlling member.

2. A brake for a movable element, said brake comprising a plurality of interconnected shoes, a brake controlling member, means comprising a pair of projections connecting said member with said shoes and responsive to movement of said member in one direction for applying said shoes to said element in either direction of operation thereof, one of said projections constituting a fulcrum for said member when said element operates in one direction and the other of said projections constituting a fulcrum for said member when said element operates in the opposite direction.

3. A brake for a movable element, said brake comprising a plurality of interconnected shoes, a brake controlling member, a member having a pair of slots, means comprising a pair of projections extending into said slots for connecting said brake controlling member with said shoes, the parts being so constructed and arranged that the projection connecting said member with one of said shoes constitutes a fulcrum for said member when said element operates in one direction while the shoe connected to the other of said projections is dragged by said element to assist in effecting application of the brake, and said other projection constitutes a fulcrum for said member when said element operates in the opposite direction while the shoe connected to the first mentioned projection is dragged by said element to assist in effecting application of said brake.

4. A brake for an element operable in either of opposite directions, said brake comprising a pair of shoes and means intermediate the shoes of said pair for interconnecting the same, a brake controlling member, means comprising a pair of projections connecting said member with the respective shoes of said pair and responsive to movement of said member in one direction for applying said shoes to said element in either direction of operation thereof, one of said projections constituting a fulcrum for said member when said element is operated in one direction and the other of said projections constituting a fulcrum for said member when said element is operated in the opposite direction.

5. A brake for an element operable in either of opposite directions, said brake comprising a pair of shoes and means intermediate the shoes of said pair for interconnecting the same, a brake controlling member, means comprising a pair of projections connecting said member with the respective shoes of said pair, the parts being so constructed and arranged that the projection connecting said member with one of said shoes constitutes a fulcrum of said member when said element operates in one direction while the shoe connected to the other of said projections is dragged by said element to assist in effecting application of the brake, and said other projection constitutes a fulcrum for said member when said element operates in the opposite direction while the shoe connected to the first mentioned projection is dragged by said element to assist in effecting application of said brake.

6. A brake for a movable element, said brake comprising a plurality of interconnected shoes, a brake controlling member, a stationary member having a pair of slots, a pin extending from one of said shoes into said controlling member and projecting into one of said slots, a link connected to another of said shoes, and a pin extending from said link into said controlling member and projecting into the other of said slots.

7. A brake for an element operable in either of opposite directions, said brake comprising a pair of shoes and means intermediate the shoes of said pair for interconnecting the same, a brake controlling member, and connections between said member and said pair of shoes and so constructed and arranged that the connection with one of said shoes provides a fulcrum for said member in one direction of operation of said member while the other of said shoes is dragged by said element to assist in applying the brake and the connection between said member and said other shoe of said pair provides a fulcrum for said member in the opposite direction of operation of said member while the first mentioned shoe is dragged by said member to assist in applying the brake.

8. A brake for an element operable in either of opposite directions, said brake comprising a pair of shoes and means intermediate the shoes of said pair for interconnecting the same, a brake controlling member, and connections between said member and the shoes of said pair and responsive to movement of said member in one direction for applying said shoes to said element in either direction of operation thereof, said connections being so constructed and arranged that one of said pair of shoes assists in applying the brake in one direction of operation of said element and the other of said pair of shoes assists in applying the brake in the opposite direction of operation of said element.

9. A brake for an element operable in either of opposite directions, said brake comprising shoes, a brake controlling member, elements connecting said shoes with said member, and second member having slots in which said connecting elements are received, the parts being so constructed and arranged as to cause one of said connecting elements to become a fulcrum for said controlling member during operation of the first mentioned element in one direction and the other of said connecting elements to become a fulcrum for said controlling member during operation of the first mentioned element in the opposite direction.

10. A brake for a movable element, said brake comprising a pair of shoes, a third shoe intermediate the shoes of said pair and connected thereto, a brake controlling member, a stationary member having a pair of slots therein, means extending into one of said slots and connecting one of the shoes of said pair with said brake controlling member, and means extending into the other of said slots and connecting the other shoe of said pair with said brake controlling member.

11. A brake for a movable element, said brake comprising a pair of shoes, a third shoe intermediate the shoes of said pair and connected thereto, a brake controlling member, a member having a pair of slots, means comprising a pair of projections extending into said slots for connecting said brake controlling member, with the respective shoes of said pair, the parts being so constructed and arranged that the projection connecting said member with one of said shoes constitutes a fulcrum for said member when said element operates in one direction while the shoe connected to the other of said projections is dragged by said element to assist in effecting application of the brake, and said other projection constitutes a fulcrum for said member when said element operate in the opposite direction while the shoe connected to the first mentioned projection is dragged by said element to assist in effecting application of said brake.

12. A brake for a movable element, said brake comprising a pair of shoes, a third shoe intermediate the shoes of said pair and connected thereto, a brake controlling member, a stationary member having a pair of slots, a pin extending from one of the shoes of said pair into said controlling member and projecting into one of said slots, a link connected to the other shoe of said pair, and a pin extending from said link into said controlling member and projecting into the other of said slots.

13. A brake for an element operable in either of opposite directions, said brake comprising a plurality of interconnected shoes, a brake controlling member, and connections between said member and said shoes and so constructed and arranged that the connection with one of said shoes provides a fulcrum for said member in one direction of operation of said element while the other of said shoes is dragged by said element to assist in applying the brake and the connection between said member and another of said shoes provides a fulcrum for said member in the opposite direction of operation of said element while the first mentioned shoe is dragged by said element to assist in applying the brake.

14. A brake for an element operable in either of opposite directions, said brake comprising a plurality of interconnected shoes, a brake controlling member, and connections between said member and said shoes and so constructed and arranged that one of said shoes assists in applying the brake in one direction of operation of said member and another of said shoes assists in applying the brake in the opposite direction of rotation of said member.

15. A brake for an element operable in either of opposite directions, said brake comprising a plurality of interconnected shoes, said element and shoes having a plurality of wedge-shaped braking surfaces adapted and arranged to be brought into frictional engagement, a brake controlling member, and connections between said member and said shoes so constructed and arranged that one of said shoes assists in applying the brake in one direction of operation of said member and another of said shoes assists in applying the brake in the opposite direction of rotation of said member.

16. A brake as set forth in claim 15 in which the included angle between the wedge-shaped surfaces is about forty-five degrees.

17. A brake for an element operable in either of opposite directions, said brake comprising a pair of shoes, means intermediate the shoes of said pair for interconnecting the same, said element and shoes having a plurality of wedge-shaped brake surfaces with an included angle of about forty-five degrees adapted and arranged to be brought into frictional engagement, a brake controlling member, means comprising a pair of projections connecting said member with the respective shoes of said pair, one of said projections constituting a fulcrum for said member when said element is operated in one direction and the other of said projections constituting a fulcrum for said member when said element is operated in the opposite direction, and a releasing spring connected to said intermediate means.

18. A brake mechanism having in combination, a rotatable brake drum, a flexible braking means extending about and engaging said drum, a stationary member at one side of said drum having slots therein spaced different distances from the center of said drum, a brake operating member connected to the ends of said braking means, said brake operating member having means extending into both of said slots and movable therein so that said member may be swung in one direction and will fulcrum on one or the other of said last mentioned means to tighten said braking means on said drum according to the direction of rotation of said drum.

19. A brake mechanism having in combination, an element movable in opposite directions, a flexible braking means extending about said element and engaging the same to apply braking pressure thereto, a stationary member, a swingable brake operating member connected to the ends of said braking means and also carrying spaced means engageable with said stationary member and spaced different distances from said element so that said brake operating member may be swung in one direction and will fulcrum on one or the other of said last mentioned means to tighten said braking means according to the direction of rotation of said drum.

ED S. SMITH, Jr.